E. E. BRODHEAD.
BAKER'S TRAY.
APPLICATION FILED SEPT. 13, 1910.
1,007,670.
Patented Nov. 7, 1911.
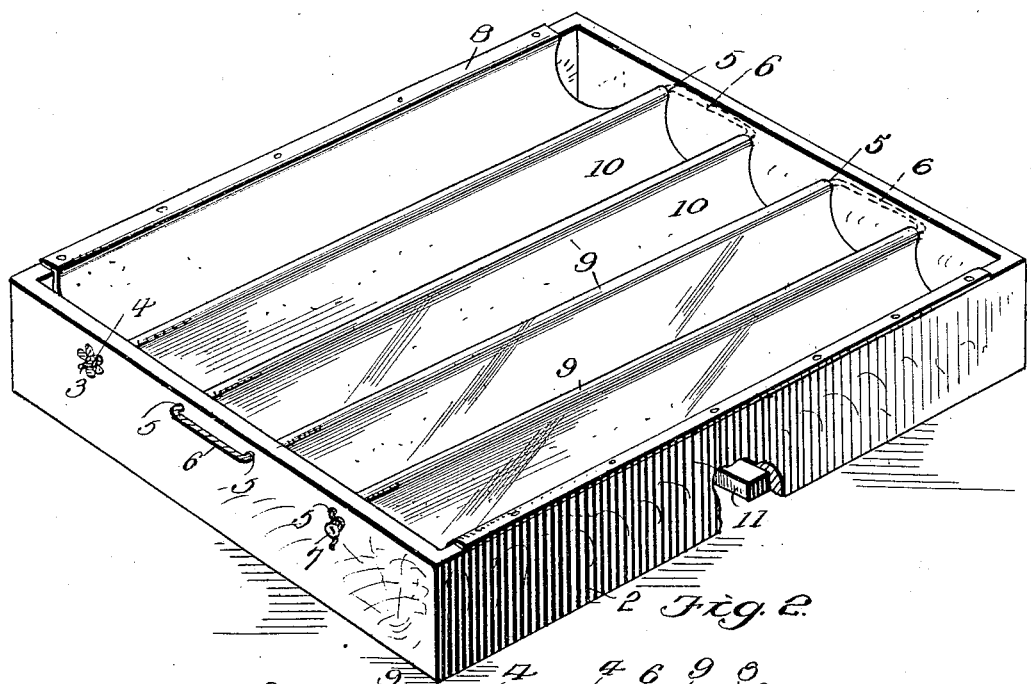
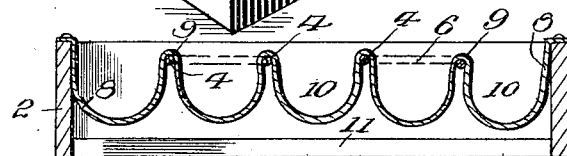
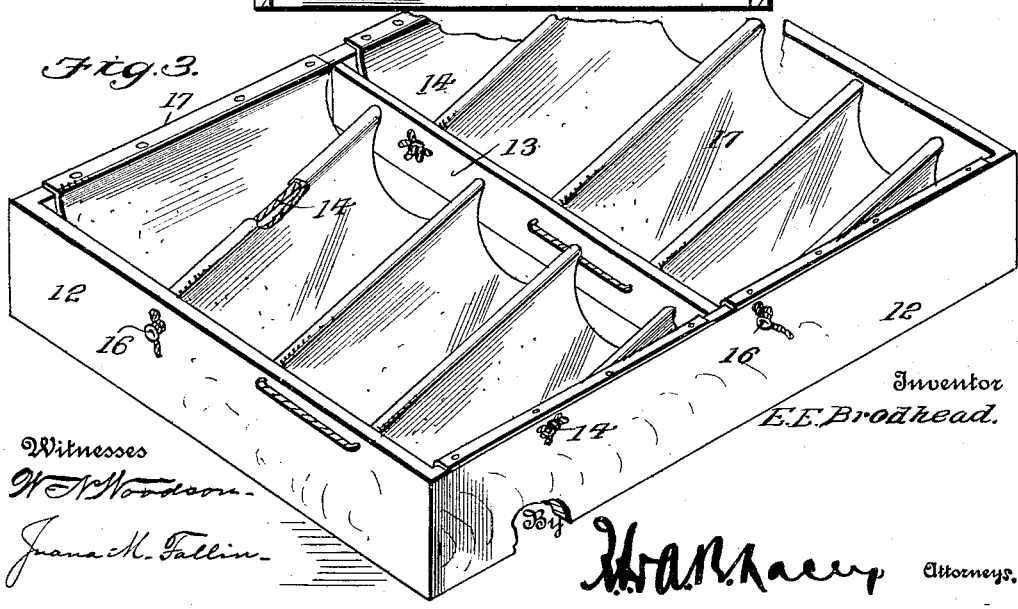
Witnesses
Inventor
E. E. Brodhead.
Attorneys.

UNITED STATES PATENT OFFICE.

EDWARD E. BRODHEAD, OF NEW YORK, N. Y.

BAKER'S TRAY.

1,007,670.  Specification of Letters Patent.  Patented Nov. 7, 1911.

Application filed September 13, 1910.  Serial No. 581,867.

*To all whom it may concern:*

Be it known that I, EDWARD E. BRODHEAD, a citizen of the United States, residing in the borough of the Bronx, New York city, and State of New York, have invented certain new and useful Improvements in Bakers' Trays, of which the following is a specification.

My invention relates to a tray adapted to be used for raising rolls before they are put into the oven and adapted to be then placed upon the peel or shovel for introduction into the oven.

In the ordinary operation of baking, the dough is raised in any suitable tray and the loaves or rolls are then lifted from the tray and placed upon the peel, after which they are inserted within the oven.

The object of my invention is to provide a device which does away with the removal of the dough from the tray and provides a tray in which the dough may be raised and then the tray itself, with the dough in place therein, placed upon the peel for insertion into the oven.

Two forms of my invention are shown in the accompanying drawing, in which—

Figure 1 is a perspective view of one form of tray. Fig. 2 is a transverse section thereof. Fig. 3 is a perspective view of another form of tray for supporting Vienna bread.

Referring to Figs. 1 and 2, 2 designates a rectangular frame of metal, wood or any other suitable material, this frame being preferably about 30 inches long, about 18 inches wide and 3 inches high, though it may be, of course, made in any desired size. Extending longitudinally of the tray are a plurality of supporting cords which are attached to the ends of the frame, and supported upon these cords and looped over the same so as to form a plurality of shallow troughs is a canvas support or bottom. In detail, the cord 3 at one end is passed through an opening 4 formed in one end piece of the frame, and the cord is knotted so as to prevent it from pulling through the opening 4. The cord is then carried longitudinally across the frame and preferably passed through an opening 5. The cord then extends along the end of the frame. as at 6, passed through another opening 5, then extended longitudinally across the frame parallel to the first stretch of the cord, passed again through an opening 5, again extends along the frame on that side, again passed through an opening and is then extended to the opposite frame bar and again brought back across the frame. The cord is thus passed back and forth longitudinally across the frame to form a plurality of parallel spaced lengths of cord. The extremity of the cord is attached to a tightening screw 7. By turning this tightening screw the cord is wound up thereon and is stretched and kept taut across the frame. It will thus be seen that a series of longitudinal parallel stretches of cord are provided, the cord being rigidly fastened at one end and connected to a tightening screw at the other, whereby the cord may be tightened or loosened if desired and thus any slack taken up. I do not wish to be limited to any particular manner of attaching these longitudinal cords or strands.

Attached to the side frame bars of the tray in any suitable manner is a canvas bottom designated 8. This canvas is very slack and is looped over the longitudinally extending cords as at 9. The canvas hangs down between each of the cords in loops so as to form a plurality of longitudinally extending troughs 10 in which the dough is to be placed.

The brace or support 11 is attached to the side bars of the frame and extends across the middle of the tray. Preferably this brace is located on the bottom of the tray and the brace should be so disposed that it does not project below the tray, for the reason that the trays have to be set one upon another.

While I do not wish to be limited to cords made of fibrous material as a means for supporting the canvas bottom, I find in practice that a cord or rope of fiber is best for this purpose as it is easily attached to the frame or detached therefrom, may be easily tightened when required and furthermore it does not rust.

A tray of the character above described will hold thirty rolls or about twelve loaves of bread, the tray being of such size as to be easily supported on the baker's peel. Where the rolls are placed directly on the peel only five or six can be placed in the oven at one time.

Another form of my invention is shown in Fig. 3, this form being adapted to be used for loaves of Vienna bread and being designed to prevent the loaves touching each other. In this form the frame is rectangular, as above described, and is designated 12. The tray is divided across its middle by a transverse brace 13 so as to form two compartments. A cord 14 is fastened at one end, as at 16, as previously described, and passed through an opening in the end bar of the tray. It then extends through the cross piece 13, extends along said cross piece and is brought back and forth across the cross piece at the end of the tray. The lengths of cord, however, while parallel to each other do not extend parallel to the sides of the tray as in the previously described form but are diagonal to said sides. The other half of the tray is also crossed and recrossed by the diagonally placed cords 14, these cords being attached to the winding screws 16 in the same manner as previously described. Canvas 17 is stretched over the cords so as to form a plurality of diagonally extending troughs, each trough being adapted to hold a loaf of bread.

In practical use the dough in the form of rolls is placed within the canvas troughs and allowed to raise. When the bread is properly raised the trough is placed upon the baker's peel and inserted in the oven, the peel, of course, being slipped from beneath the tray. It will be seen that in both forms of my invention the peel does not touch the bread or rolls supported within the tray for the reason that the canvas bottom does not sag below the lower edge of the frame. When filled with dough, the trays may be placed one upon another while the bread is rising. It will thus be seen that my device is very simple, can be kept entirely clean, a most important point in baking, and may be easily repaired, while any slack formed in the material in the bottom may be readily taken up.

Having thus described my invention, what is claimed as new is:

1. A baker's tray, including a rectangular frame open at the bottom, parallel supporting elements attached to the sides of the frame and extending across the same at the top thereof, and flexible, woven supporting material attached to the frame and supported by said elements, said woven material depending between and below said elements to form a series of spaced troughs.

2. A baker's tray, comprising a rectangular frame open at the bottom, parallel lengths of cord attached to the frame and extending across the same, and flexible, woven, supporting material attached to the frame and supported by said lengths of cord and depending between the lengths of cords to form a series of troughs.

3. A baker's tray, comprising a rectangular frame open at the bottom, a plurality of lengths of cord attached to the upper edges of the frame and extending across the same, said lengths being parallel to each other, and canvas attached to the frame and looped over said parallel lengths of cord to form a plurality of troughs, said troughs being less in depth than the depth of the frame.

4. A baker's tray, comprising a rectangular frame, a cord attached at one end of the frame, said cord being carried back and forth across the frame to form a plurality of parallel lengths or stretches, a screw engaging with the frame and to which one end of the cord is attached whereby slackness in the cord may be taken up, and a canvas bottom attached at its opposite edges to the frame and looped over said parallel cords to form a series of parallel troughs.

5. A baker's tray, comprising a rectangular frame, a cord attached at one end to the frame, said cord being carried back and forth across the frame to form a plurality of parallel lengths, a winding screw attached to the frame and connected to one end of the cord whereby slackness of the cord may be taken up, a canvas bottom attached at its opposite edges to the frame and looped over said parallel cords to form a series of parallel troughs, and a brace extending across said frame and forming a handle whereby the frame may be lifted.

In testimony whereof, I affix my signature in presence of two witnesses.

EDWARD E. BRODHEAD. [L. S.]

Witnesses:
H. W. BROOKS,
LUCY BLACK.

Copies of this patent may be obtained for five cents each, by addressing the "Commissioner of Patents, Washington, D. C."